United States Patent [19]

Maxted

[11] 4,328,889
[45] May 11, 1982

[54] CONVEYOR MEANS

[76] Inventor: Wesley R. Maxted, 2135 Brierbrook, Germantown, Tenn. 38138

[21] Appl. No.: 171,805

[22] Filed: Jul. 24, 1980

[51] Int. Cl.³ .............................................. B65G 47/46
[52] U.S. Cl. ............................. 198/367; 193/35 MD
[58] Field of Search ............... 198/366, 367, 436, 471, 198/586, 597, 598, 601, 782, 784, 599; 193/36, 35 MD

[56] References Cited

U.S. PATENT DOCUMENTS

| Re. 25,673 | 11/1964 | Burt | 198/370 |
|---|---|---|---|
| 3,138,238 | 6/1964 | DeGood et al. | 198/362 |
| 3,219,166 | 11/1965 | Collins et al. | 198/362 |
| 3,241,651 | 3/1966 | Colby | 198/437 |
| 3,254,752 | 6/1966 | Bauch et al. | 198/358 |
| 3,921,786 | 11/1975 | Hejmanowski | 198/365 |

Primary Examiner—Robert B. Reeves
Assistant Examiner—Douglas D. Watts
Attorney, Agent, or Firm—Walker & McKenzie

[57] ABSTRACT

A conveyor system including a main conveyor, a secondary conveyor, and an article diverter for selectively diverting articles from the main conveyor onto the secondary conveyor. The diverter includes a plurality of wheels for being mounted in a single aligned row across the top surface of the main conveyor. The gap in the main conveyor for receiving the wheels is substantially the same width as the wheels.

7 Claims, 5 Drawing Figures

CONVEYOR MEANS

BACKGROUND OF THE INVENTION

1. Field of the Invention

The present invention relates to conveyors and more specifically to diverter mechanisms for selectively diverting articles from a first conveyor onto an intersecting conveyor.

2. Description of the Prior Art

A variety of conveyor means having diverting mechanisms for transferring articles from one conveyor onto an intersecting conveyor have heretofore been developed. See, for example, De Good, U.S. Pat. No. 3,138,238 and Maxted, U.S. Pat. No. 3,983,988. The system of the De Good '238 patent relies on a single roll of diverter wheels which are driven by being pressed against a powered belt. Each powered diverter wheel will therefore revolve at the same speed. Each diverter wheel is mounted to the frame of the conveyor by way of a bracket which is pivotally mounted on a bracket shaft. The gap in the conveyor to accommodate the diverter must be, therefore, wide enough to accommodate the diverter wheels and the bracket-shaft combination. The system of the Maxted '988 patent relies on two spaced-apart rows of diverting wheels. An intermediate roller is positioned between the two rolls of diverting wheels. The gap in the conveyor to accommodate the diverter must be, therefore, wide enough to accommodate both rows of diverting wheels and the intermediate roller.

SUMMARY OF THE INVENTION

The present invention is directed towards improving upon prior conveyor-diverter means. The concept of the present invention is to provide an efficient diverter means for use in high speed transferring of selected articles from a first or main conveyor onto a second or intersecting conveyor which does not require means for conveying articles past the diverting means when the diverting means is inoperative and which does not affect the maintenance of an accurate memory for the destination of each article.

The conveyor means of the present invention comprises, in general, a main conveying means, a secondary conveyor means, and an article diverting means for selectively diverting articles from the main conveyor means onto the secondary conveyor means. The main conveyor means includes an article-supporting conveyor surface having a transversely extending gap therein. The diverting means includes a plurality of diverter wheel means for being mounted in a single aligned row within the gap in the article-supporting conveyor surface. The gap is substantially the same width as the diverter wheels.

One object of the present invention is to allow a plurality of diverting means to be associated with a main conveyor means with one, all or a selected number of the diverting means used as drives to transmit power to the main conveyor means. By so using the diverting means as drives, it is possible to provide a single main conveyor means of indefinite length with any number of diverting means.

DESCRIPTION OF THE PREFERRED EMBODIMENT

Figure 1:
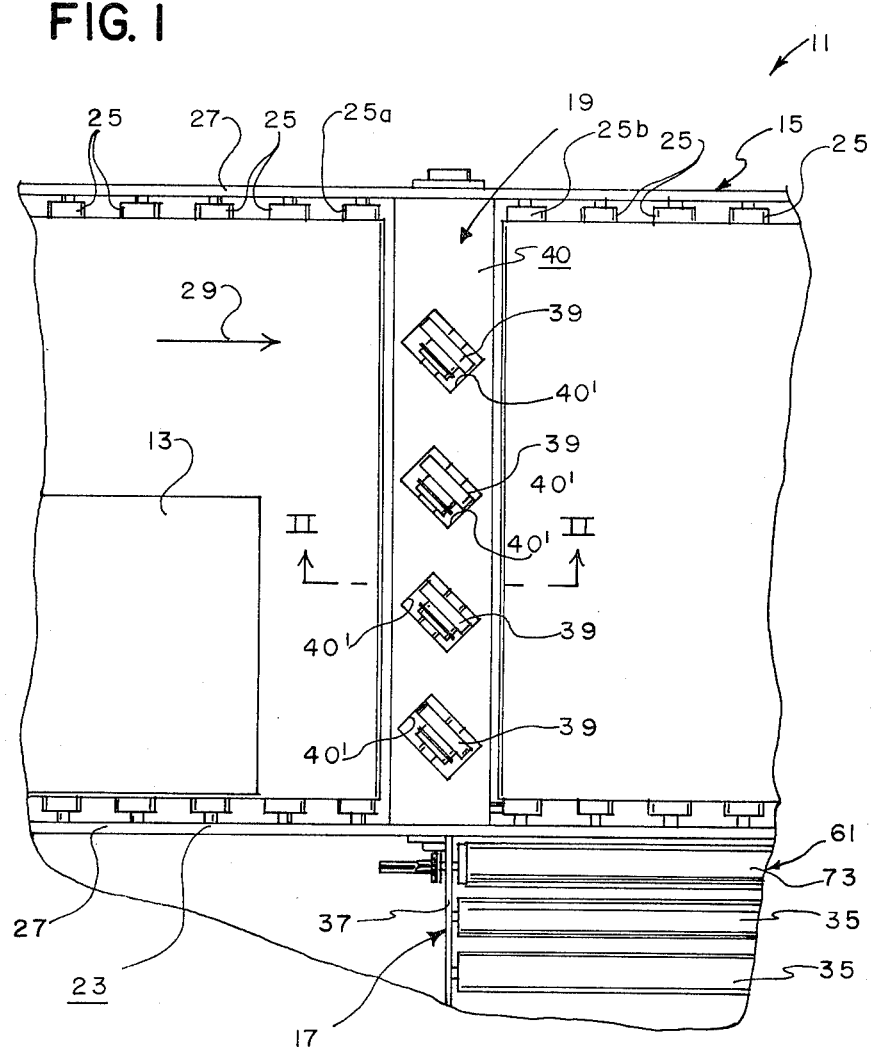
FIG. 1 is a top plan view of a portion of the conveyor means of the present invention.

The conveyor means 11 of the present invention is for use especially in the high speed conveying of articles 13 (e.g., sixty articles per minute or more). The conveyor means 11 includes, in general, a main or first conveyor means 15, an intersecting or second conveyor means 17, and an article diverting means 19 for selectively diverting articles 13 from the first conveyor means 15 onto the second conveyor means (see, in general, FIG. 1).

Figure 2:
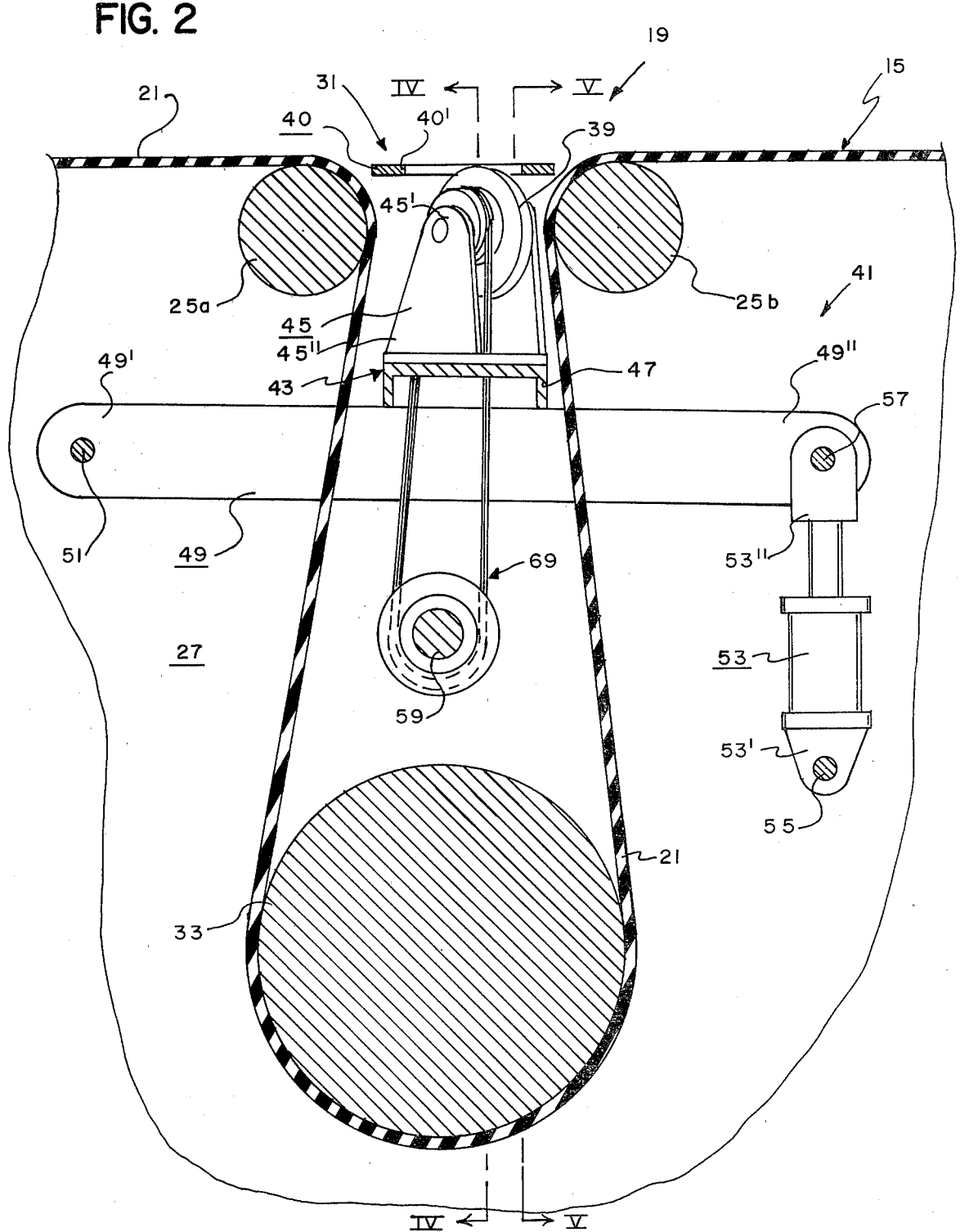
FIG. 2 is a somewhat diagrammatic sectional view of a portion of the conveyor means of the present invention substantially as taken on line II—II of FIG. 1 with the diverting means thereof in an inoperative position.
Figure 3:
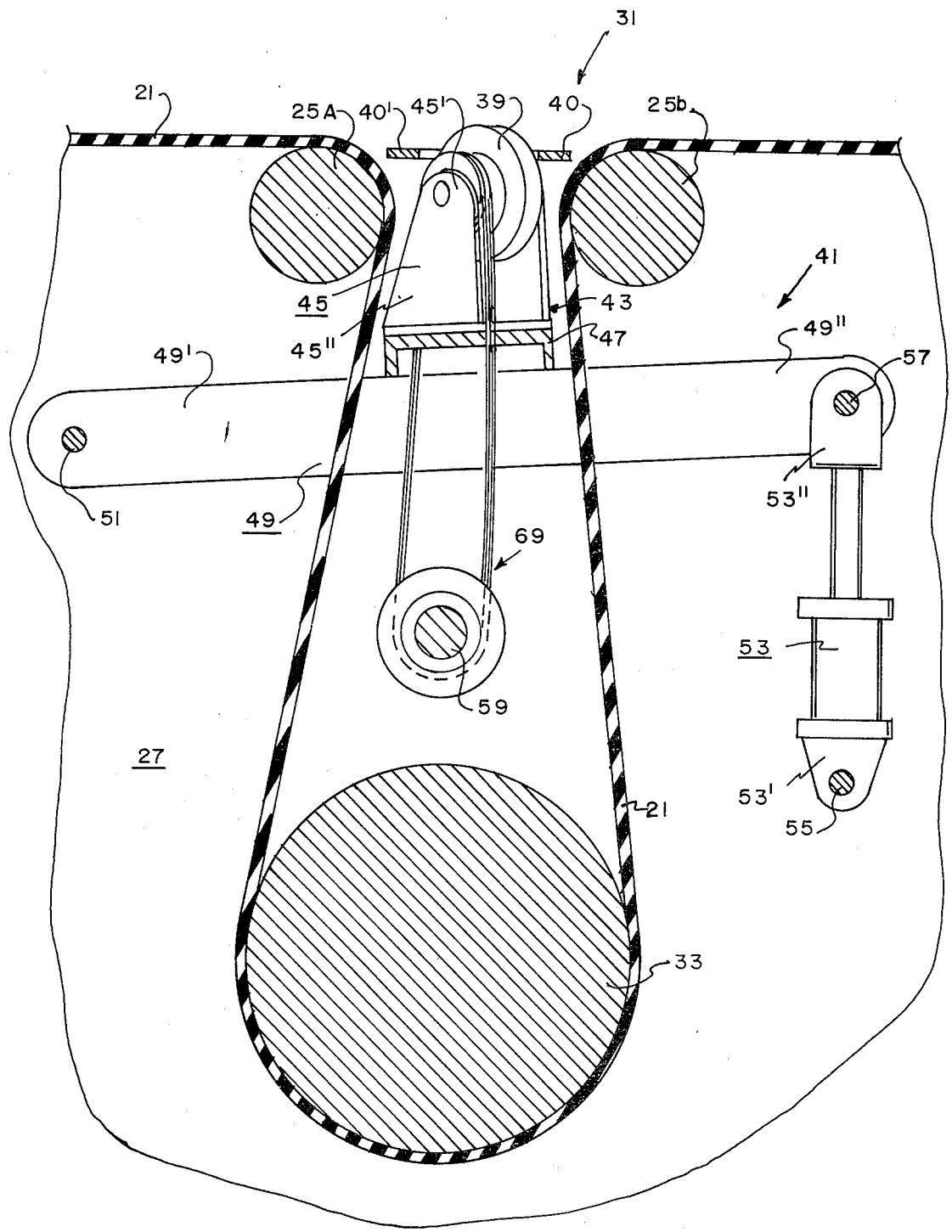
FIG. 3 is a sectional view similar to FIG. 2 but with the diverting means in an operative position.

The first conveyor means 15 may be of substantially any typical construction known to those skilled in the art such as a belt-type conveyor or a flat slider bed type conveyor. The embodiment of the first conveyor means 15 shown in the drawings is a belt-type conveyor that includes, in general, a belt 21 for defining an article-supporting conveyor surface and a frame means 23 for supporting the belt 21. The frame means 23 preferably includes a plurality of rollers 25 for supporting the belt 21 in a manner that will be apparent to those skilled in the art and support structure 27 for supporting the rollers 25. The belt 21 may be driven in any manner apparent to those skilled in the art such as by way of a typical drive motor (not shown) to cause the articles 13 to move in the direction of the arrow 29 in FIG. 1. The belt 21 is arranged so that a transversely extending gap 31 is provided therein at the location of the diverting means 19. The gap 31 may be formed by the belt 21 passing beneath a transverse roller member 33 that is positioned at a height below the rollers 25. More specifically, the belt 21 passes over a first one of the rollers 25 (hereinafter identified as roller 25b) as clearly shown in FIGS. 2 and 3 to thereby form the gap 31. The gap 31 will thus have a top opening with a width substantially equal to the spaced apart distance of the rollers 25a, 25b. The roller member 33 preferably is of a larger diameter than the rollers 25a, 25b to create sufficient space within the gap 31 for the diverting means 19 in a manner which will hereinafter become apparent.

The second conveyor means 17 may also be of substantially any typical construction known to those skilled in the art such as a driven or nondriven gravity type conveyor, chute or slide. The embodiment of the second conveyor means 17 shown in the drawings is a nondriven gravity type conveyor that includes, in general, a plurality of rollers 35 for defining an article supporting conveyor surface and a frame means 37 for supporting the rollers 35. The second conveyor means 17 intersects the first conveyor means 15 substantially at the gap 31 to cause the diverter means 19, when activated, to divert articles 13 from the first conveyor means 15 onto the second conveyor means 17. The exact placement of the second conveyor means 17 with respect to the diverting means 19 will be apparent to those skilled in the art.

The diverting means 19 includes a plurality of diverter wheels 39 mounted in a single aligned row within the gap 31 (see FIG. 1). The diverter wheels 39 are substantially the same width as the gap 31 and are skewed in a direction so as to selectively divert the articles 13 onto the second conveyor means 17 in a manner as will be apparent to those skilled in the art. A plate-like platform member 40 is preferably positioned in the gap 31 substantially even with the upper side of the article supporting conveyor surface of the belt 21 to prevent the articles 13 passing over the gap 31 from falling even partially within the gap 31. The platform member 40 has a plurality of apertures 40' therein for allowing the diverter wheels 39 to selectively extend therethrough. The diverting means also includes an actuator means 41 for selectively moving the diverter wheels 39 between an operative position in which at least a portion of the diverter wheels 39 extend above the article supporting conveyor surface of the belt 21 to cause articles 13 to be diverted from the first conveyor means 15 onto the second conveyor means 17 (see FIG. 3) and an inoperative position in which no portion of the diverter wheels 39 extend above the article supporting conveyor surface of the belt 21 whereby the articles 13 moving along the first conveyor means 15 will merely be conveyed past the second conveyor means 17 (see FIG. 2). The diverting means 19 includes support means 43 for supporting the diverter wheels 39. The support means 43 includes a plurality of superstructure members 45 for engaging the diverter wheels 39. Each superstructure member 45 includes an upper end 45' and a lower end 45". The upper ends 45' of the superstructure means 45 being located within and being no wider than the gap 31. The support means 43 also includes a substructure member 47 for rigidly joining the plurality of superstructure members 45 together. The actuator means 41 includes at least one and preferably two arm members 49. Each arm member 49 has a first end 49' and a second end 49". The first end 49' of each arm member 49 is pivotally attached to a supporting surface such as the frame means 23 of the first conveyor means 15 in any manner apparent to those skilled in the art such as by way of a pivot rod 51. The arm members 49 are preferably provided one on either side of the belt 21 below the gap 31 and above the roller member 23. The substructure member 47 of the supporting means 43 is preferably supported on the arm members 49 intermediate the first and second ends 49', 49" thereof and extends from one arm member 49 to the other arm member 49 through the gap 31. The actuator means 41 may include a piston means 53 attached to the second end 49" of the arm members 49 for selectively causing the arm members 49 to move between a first position in which the diverter wheels 39 are in the operative position (see FIG. 3) and a second position in which the diverter wheels 39 are in the inoperative position (see FIG. 2). The piston means 53 may be of any typical construction and operation well known to those skilled in the art. The piston 53 preferably has a first end 53' pivotally attached to support structure such as the frame means 23 of the first conveyor means 15 in any manner apparent to those skilled in the art such as by way of a pivot rod 55, and has a second end 53" pivotally attached to the second ends 49" of the arm members 49 in any manner apparent to those skilled in the art such as by way of a pivot rod 57 that extends between the second ends 49" of the two arm members 49. The piston means 53 may be electrically, hydraulically or pneumatically activated.

Figure 4:
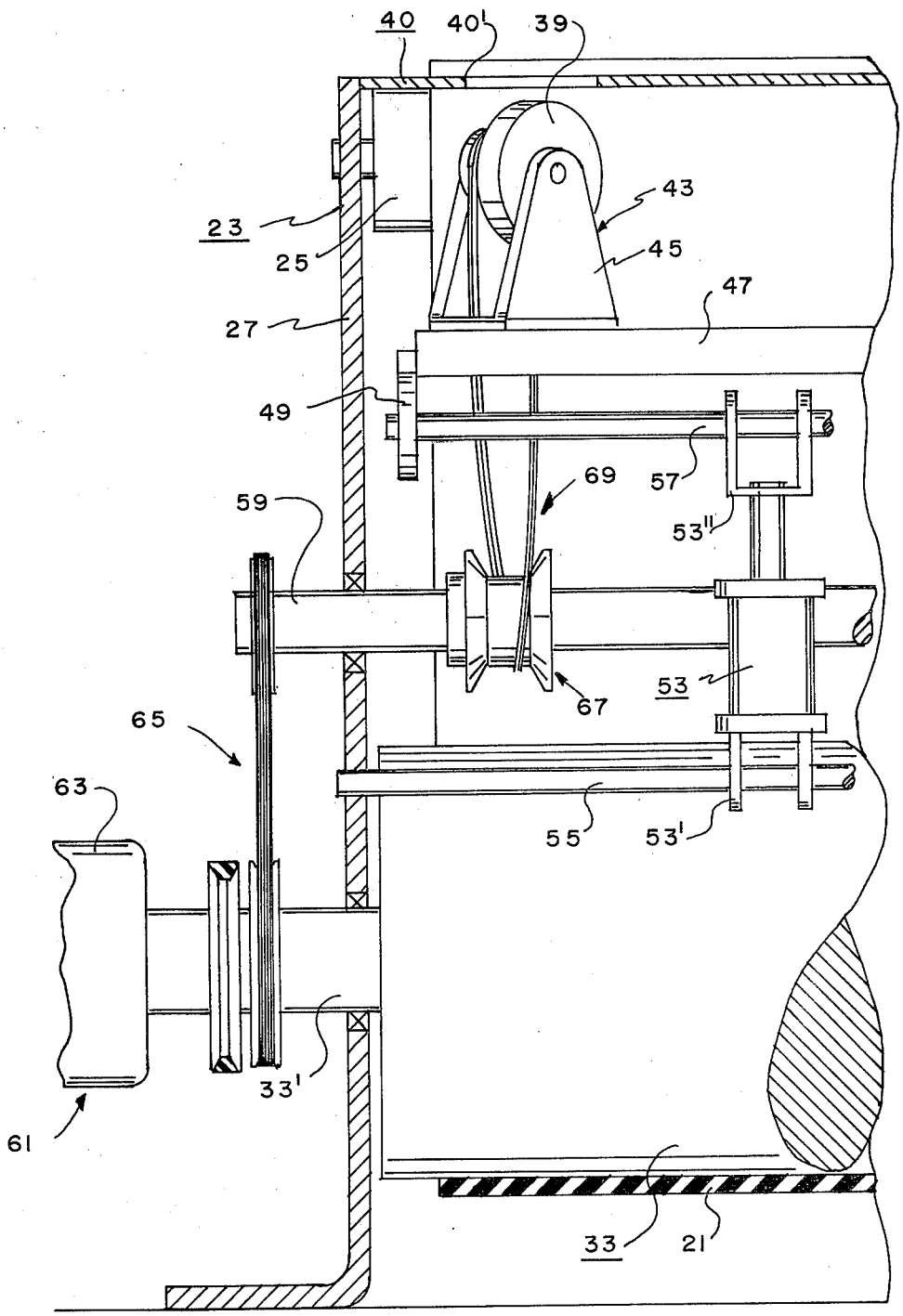
FIG. 4 is a somewhat diagrammatic sectional view of a portion of the conveyor means of the present invention substantially as taken on line IV—IV of FIG. 2.

The diverter means 19 includes a shaft 59 extending transverse of the belt 21 within the gap 31 and above the roller member 33 and includes a first drive means 61 for causing the shaft 59 to rotate. The first drive means 61 may be of various construction apparent to those skilled in the art. For example, the first drive means 61 may include a drive motor 63 of any typical construction and operation and may include a belt-and-sheave drive mechanism 65 for transferring rotation from the drive motor 63 to the shaft 59 in a manner as will now be apparent to those skilled in the art (see FIG. 4). The diverter means 19 also includes a second drive means 67 for causing the diverter wheels 39 to rotate in response to the rotation of the shaft 59. The second drive means 67 may consist simply of a plurality of belt-and-sheave drive mechanisms 69 for transferring rotation from the shaft 59 to each of the diverter wheels 39 when the diverter wheels 39 are in the operative position (see FIGS. 2 and 3). The belt-and-sheave drive mechanisms 69 can allow, due to slipage, different sizes of sheaves, etc., a variance in the speed of revolution of each of the diverter wheels 39. This is desirable as each powered diverting wheel 39 should be able to seek its best speed depending on its position on the bottom of the article 13 being diverted regardless of the speed of the belt 21.

It should be noted that the belt 21 and the roller member 33 may frictionally engage one another for causing a transfer of power therebetween. Normally, the pressure of the belt 21 against the roller member 33 will cause the shaft portion 33' of the roller member 33 to rotate thereby causing the belt-and-sheave drive mechanism 65 to rotate the shaft 59 which, in turn, causes the belt-and-sheave mechanism 69 to rotate the diverter wheels 39. In this manner, the shaft 59 may be rotated by way of the roller member 33. That is, the belt-and-sheave drive mechanism 65 may extend between the roller member 33 and the shaft 59 to transfer rotation from the roller member 33 to the shaft 59 and the drive motor 63 may be omitted. On the other hand, when the capacity of the typical drive motor of the first conveyor means 15 is exceeded as may be the case when a plurality of diverter means 19 is utilized, the shaft portion 33' of the roller member 33 may be drivably coupled to and rotatably driven by the drive motor 63. It is therefore possible and practical to provide power to the belt 21 through the drive motor 63. This will make possible a sortation conveyor of any given length with no maximum length stipulated by merely having a plurality of diverting means 19 with all or a selected number thereof used as drives via the drive motors 63. The several drive motors 63 can be selected so that each drive contributes in a near equal manner to driving the belt 21. By thus adding power to the belt 21 through several diverting means 19, less total power is needed due to the lessening of internal friction and belt tension. For example, it could well be that a single drive means for the first conveyor means 15 would normally require a 10 horsepower motor. By selectively using four spaced-apart diverting means 19 as drives for the belt 21, only four 2 horsepower motors (8 horsepower total) might be required. The more diverting means 19 that are used as drives for the belt 21 in the above manner, the less total horsepower will be required to drive the belt 21.

Figure 5:
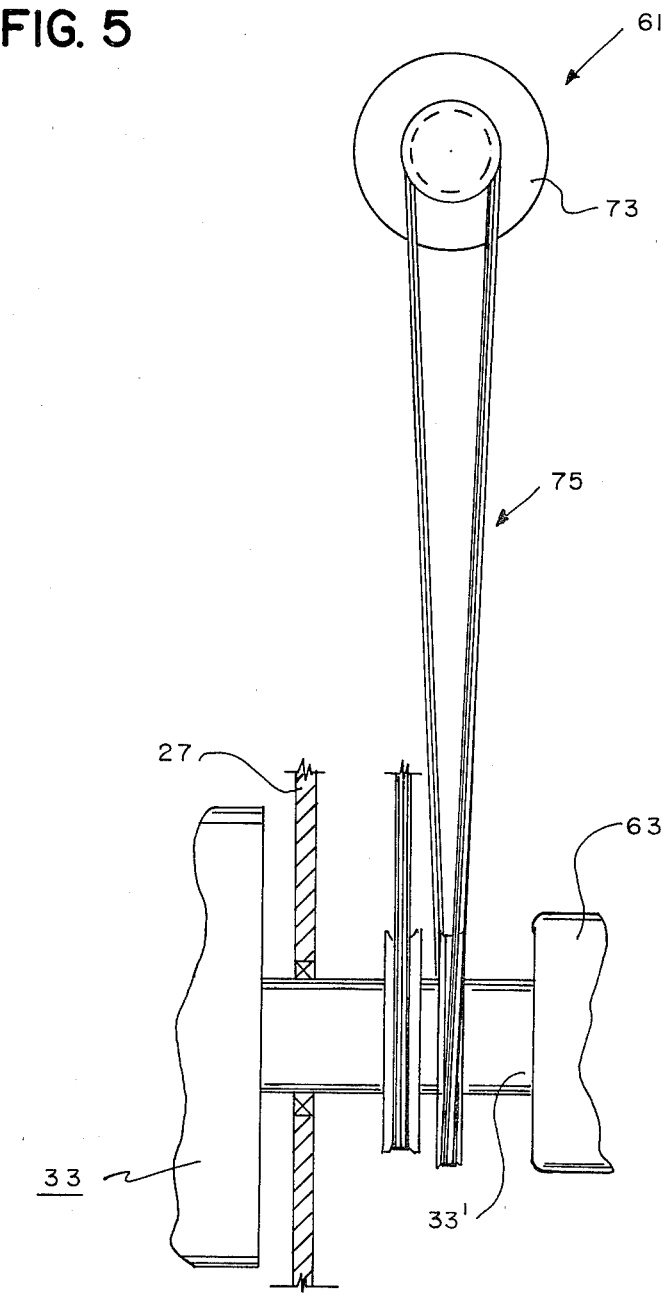
FIG. 5 is a somewhat diagrammatic sectional view of a portion of the conveyor means of the present invention substantially as taken on line V—V of FIG. 2.

An intermediate conveyor means 71 may be positioned between the first and second conveyor means 15, 17. The intermediate conveyor means 71 includes an elongated roller member 73 that is driven in any manner apparent to those skilled in the art such as, for example, by way of a belt-and-sheave drive mechanism 75 extending between the drive motor 61 and the roller member 73 to cause the roller member 73 to revolve (see, in general, FIG. 5). The roller member 73 is located adjacent one side of the first conveyor means 15 immediately downstream of the diverting means 19 with its longitudinal axis parallel to the longitudinal axis of the first conveyor means 15. The driven roller member 73 is used to aid the diverting means 19 in diverting articles 13 onto the second conveyor means 17 when the second conveyor means 17 is of the nondriven type.

The use and operation of the conveyor means 11 will be apparent to those skilled in the art. In general, articles 13 will be placed on the belt 21 and conveyed in the direction of the arrow 29. When it is desired to divert any specific article 13 from the first conveyor means 15 onto the second conveyor means 17, the actuator means 41 is activated as that specific article approaches the diverting means 19. The actual activation of the actuator means 41 may be in any manner apparent to those skilled in the art such as by way of a typical reflective detector and control means (not shown) for detecting various code symbols on the articles in a manner apparent to those skilled in the art. When the actuator means 14 is activated, the diverter wheels 39 will be moved from the inoperative position to the operative position to cause the specific article 13 to be diverted from the first conveyor means 15 to the second conveyor means 17 in a manner as will be apparent to those skilled in the art.

Although the invention has been described and illustrated with respect to a preferred embodiment thereof, it is not to be so limited since changes and modifications may be made therein which are within the full intended scope of the invention.

I claim:

1. Conveyor means comprising a main conveyor means; a secondary conveyor means; an article diverting means for selectively diverting articles from said main conveyor means onto said secondary conveyor means; said main conveyor means including an article-supporting conveyor surface, said article-supporting surface of said main conveyor means having a transversely extending gap therein, said diverting means including a plurality of diverter wheels for being mounted in a single aligned row within said gap in said article-supporting conveyor surface of said main conveyor means, said gap being substantially the same width as said diverter wheels, said diverting means including support means for supporting said diverter wheels, said support means including a plurality of superstructure means for engaging said diverter wheels, each of said superstructure means including an upper end and a lower end, said upper ends of said superstructure means being located within and being no wider than said gap in said article-supporting conveyor surface of said main conveyor means, said support means including a substructure means for rigidly joining said plurality of superstructure means together; and an actuator means for selectively moving said diverter wheels between an operative position in which at least a portion of said diverter wheels extend above said article-supporting conveyor surface of said main conveyor means and an inoperative position in which no portion of said diverter wheels extends above said article-supporting conveyor surface of said main conveyor means; said actuator means including an arm member having a first end pivotally attached to the frame of said main conveyor means and having a second end, said substructure means of said support means being supported by said arm member intermediate said first and second ends thereof, said actuator means including a piston means attached to said second end of said arm member thereof for selectively causing said arm member to pivot between a first position in which said diverter wheels are in said operative position and a second position in which said diverter wheels are in said inoperative position.

2. The conveyor means of claim 1 in which said main conveyor means includes a belt conveyor for defining said article-supporting conveyor surface, includes a first roller member positioned transverse to said belt conveyor and at a height substantially equal to said an article-supporting surface, includes a second roller member positioned transverse to said belt conveyor and at a height below the article-supporting conveyor surface, and includes a third roller member positioned transverse to said belt conveyor at a height substantially equal to said article-supporting conveyor surface; and in which said belt conveyor passes over said first roller member, under said second roller member and over said third roller member thereby defining said gap in said article-supporting conveyor surface with the width of said gap being defined by the space between said first and third roller means.

3. The conveyor means of claim 2 in which said second roller member has a substantially large diameter, in which diverter means includes a shaft extending transverse of said belt conveyor and positioned substantially directly above said second roller member, in which said diverter means includes first drive means for causing said shaft to rotate, and in which said diverter means includes second drive means for causing said diverter wheels to rotate in response to the rotation of said shaft.

4. The conveyor means of claim 3 in which said second drive means includes a plurality of belt-and-pulley drive means for transferring rotation from said shaft to each of said diverter wheels.

5. The conveyor means of claim 3 in which said large diameter of said second roller member creates a space above said belt conveyor for said diverting means.

6. The conveyor means of claim 4 in which said belt conveyor and said second roller member frictionally engage one another for causing a transfer of power therebetween.

7. The conveyor means of claim 4 in which is included a plurality of article diverting means and in which is included a plurality of drive motor means for driving said second roller members of various ones of said plurality of diverting means and for providing power to said belt conveyor of said main conveyor means.

* * * * *